(12) United States Patent
Heinken et al.

(10) Patent No.: US 11,339,711 B2
(45) Date of Patent: May 24, 2022

(54) METHOD FOR OPERATING AN INTERNAL COMBUSTION ENGINE WITH AN EXHAUST-GAS TURBOCHARGER HAVING VARIABLE TURBINE GEOMETRY

(71) Applicant: VOLKSWAGEN AKTIENGESELLSCHAFT, Wolfsburg (DE)

(72) Inventors: Sebastian Heinken, Braunschweig (DE); Matthias Kreft, Wolfsburg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 72 days.

(21) Appl. No.: 16/495,023

(22) PCT Filed: Apr. 5, 2018

(86) PCT No.: PCT/EP2018/058738
§ 371 (c)(1),
(2) Date: Jun. 18, 2020

(87) PCT Pub. No.: WO2018/185225
PCT Pub. Date: Oct. 11, 2018

(65) Prior Publication Data
US 2020/0309023 A1    Oct. 1, 2020

(30) Foreign Application Priority Data

Apr. 5, 2017  (DE) .................... 10 2017 107 297.7

(51) Int. Cl.
*F02B 37/24* (2006.01)
*F02D 41/00* (2006.01)
*F02D 41/14* (2006.01)

(52) U.S. Cl.
CPC .......... *F02B 37/24* (2013.01); *F02D 41/0007* (2013.01); *F02D 41/1401* (2013.01);
(Continued)

(58) Field of Classification Search
CPC .......... F02B 37/12; F02B 37/22; F02B 37/24; F02D 41/0007; F02D 41/1448;
(Continued)

(56) References Cited

U.S. PATENT DOCUMENTS 5,174,119 A    12/1992 Hanauer et al.
5,850,737 A    12/1998 Aschner et al.
(Continued)

FOREIGN PATENT DOCUMENTS

CN    105888861 A    8/2016
DE    40 25 901 C1    1/1992
(Continued)

OTHER PUBLICATIONS

International Search Report of PCT Application No. PCT/EP2018/058738, dated Jun. 21, 2018.
(Continued)

*Primary Examiner* — Audrey B. Walter
*Assistant Examiner* — Dapinder Singh
(74) *Attorney, Agent, or Firm* — Pearl Cohen Zedek Latzer Baratz LLP

(57) ABSTRACT

The invention relates to a method for operating an internal combustion engine (100) having an exhaust-gas turbocharger (5, 10, 15) for compressing the air fed to the internal combustion engine (100), wherein a drive power of a turbine (10) of the exhaust-gas turbocharger (5, 10, 15) in an exhaust tract (20) of the internal combustion engine (100) is changed through variation of a turbine geometry of the turbine (10), wherein, in a first control algorithm (I), a setpoint charge pressure ($pL_{Soll}$) at the outlet of the compressor (5) of the exhaust-gas turbocharger (5, 10, 15) in the air feed tract (50) upstream of the combustion motor (55) is controlled in a manner dependent on a setpoint exhaust-gas back pressure ($pT1_{Soll}$) to be set in an exhaust tract (20) downstream of the combustion motor (55) upstream of the turbine (10) of the internal combustion engine (100), wherein the setpoint charge pressure ($pL_{Soll}$) is assigned an opening cross-sectional area of the turbine (10), which is controlled, by means of an actuating stroke of an actuating element (25) assigned to the turbine (10), in a manner dependent on a setpoint value ($25_{Soll}$) assigned to the predefined setpoint charge pressure ($pL_{Soll}$). According to the invention, provision is made for the actuating element (25), which is actuated by means of the first control algorithm (I), of the turbine (10) to be controlled by means of a second control algorithm (II), with predefinition of an upper threshold value of the setpoint exhaust-gas back pressure ($pT_{1Soll}$) in the exhaust tract (20)

(Continued)

upstream of the turbine (10) by intervention into the first control algorithm (I) with an adapted setpoint value ($25'_{Soll}$), if, in a primary control path a) of the second control algorithm (II), a control deviation ($\Delta pT$) upstream of the turbine (10) arises which is formed from an actual exhaust-gas back pressure ($pT_{1Ist}$) upstream of the turbine (10) and the predefined setpoint exhaust-gas back pressure ($pT_{1Soll}$) upstream of the turbine (10), and, in a secondary control path b) of the second control algorithm (II), a control deviation ($\Delta pL$) downstream of the compressor (5) arises which is formed from an actual charge pressure ($pL_{Ist}$) of the compressor (5) and the setpoint charge pressure ($pL_{Soll}$) at the outlet of the compressor (5).

3 Claims, 2 Drawing Sheets

(52) U.S. Cl.
CPC .............. *F02D 2041/1418* (2013.01); *F02D 2041/1432* (2013.01)

(58) Field of Classification Search
CPC ......... F02D 2250/34; F02D 2041/1418; F02D 2041/1522; F02D 2041/1432; Y02T 10/12
USPC ....................................... 60/605.1
See application file for complete search history.

(56) References Cited

U.S. PATENT DOCUMENTS

| | | |
|---|---|---|
| 6,718,767 B1 | 4/2004 | Caddy |
| 2003/0010019 A1 | 1/2003 | Engel et al. |
| 2006/0236692 A1* | 10/2006 | Kolavennu ........... F02D 41/024 60/602 |
| 2006/0288701 A1 | 12/2006 | Ramamurthy et al. |
| 2007/0033938 A1* | 2/2007 | Ueno ..................... F02B 37/14 60/612 |
| 2015/0308332 A1* | 10/2015 | Oh ...................... F02D 41/0007 60/605.2 |
| 2016/0265468 A1* | 9/2016 | Takayanagi ............. F02B 37/18 |
| 2017/0260916 A1* | 9/2017 | Kraemer ................. F02D 23/00 |

FOREIGN PATENT DOCUMENTS

| | | |
|---|---|---|
| DE | 195 31 871 C1 | 11/1996 |
| DE | 100 10 978 A1 | 9/2001 |
| DE | 69712056 T2 | 11/2002 |
| EP | 1 471 234 A2 | 10/2004 |
| EP | 1 586 756 A1 | 10/2005 |
| FR | 2 910 542 A3 | 6/2008 |

OTHER PUBLICATIONS

Office Action for Chinese Patent Application No. 2018800160399, dated Jul. 5, 2021.

* cited by examiner

METHOD FOR OPERATING AN INTERNAL COMBUSTION ENGINE WITH AN EXHAUST-GAS TURBOCHARGER HAVING VARIABLE TURBINE GEOMETRY

CROSS-REFERENCE TO RELATED APPLICATIONS

This application is a National Phase Application of PCT International Application No. PCT/EP2018/058738, International Filing Date Apr. 5, 2018, claiming priority of German Patent Application No. 10 2017 107 297.7, filed Apr. 5, 2017, which is hereby incorporated by reference.

FIELD OF THE INVENTION

The invention relates to a method for operating an internal combustion engine having an exhaust gas turbo charger for compressing the air supplied to the internal combustion engine, wherein a drive performance of a turbine of the exhaust gas turbo charger in an exhaust gas line of the internal combustion engine is altered by varying a turbine geometry of the turbine.

BACKGROUND OF THE INVENTION

The document EP 1 471 234 A2 already describes an exhaust gas turbocharger (ATL) which is provided for compressing the air supplied to an internal combustion engine. Here, a drive performance of a turbine of the exhaust gas turbocharger is altered in an exhaust gas line of the internal combustion engine (VKM) by varying a turbine geometry. In this context, one speaks also of an exhaust gas turbocharger (ATL) having a turbine having variable turbine geometry (VTG) which is combined and abbreviated as VTG-ATL. Here, the exhaust gas flowing over the turbine impacts on guide blades which are adjustable and can thus alter the effectiveness of the turbine. When the internal combustion engine drives a vehicle, when the vehicle accelerates, the guide blades are adjusted such that a small effective opening cross-section area of the turbine results, which allows the exhaust gas counterpressure before the turbine and the flow speed of the exhaust gas to increase strongly. The method described in the document suggests, in order to operate an internal combustion engine having an exhaust gas turbo charger for compressing the supplied air, that a pressure ratio between a pressure in flow direction of the exhaust gas in the exhaust gas line after the turbine and a pressure in flow direction of the exhaust gas in the exhaust gas line before the turbine is predetermined and that depending on this pressure ratio a limit value is determined for an adjusting variable of an adjusting member for adjusting the turbine geometry. If this technology is used in the case of vehicles operated with diesel fuel one speaks of supplying the combustion air with diesel-VTG-ATL, and analogously in the case of vehicles operated with petrol one speaks of supplying the combustion air with petrol-VTG-ATL.

A disadvantage in the case of this already known method is that the adjusting variable of the adjusting member for adjusting the turbine geometry is determined only from a mathematical factor which is based on the detected pressure in flow direction of the exhaust gas in the exhaust gas line after the turbine and the pressure in flow direction of the exhaust gas in the exhaust gas line before the turbine. As already explained, when operating the internal combustion engine with VTG-ATL, high exhaust gas counterpressures can result which induce a high residual gas content in the combustion chamber and on the other hand impair the boost pressure control in the dynamic states. In particular, such dynamic states, in which a worsening of the boost pressure control is induced, are not taken into consideration in the conventional method.

SUMMARY OF THE INVENTION

The document EP 1 586 756 A1 also describes a method and a device for operating an internal combustion engine, which allow a maximum acceleration without efficiency loss of an exhaust gas turbo charger VTG-ATL. The internal combustion engine comprises a compressor of an exhaust gas turbo charger for compressing the air supplied to the internal combustion engine and an adjusting member for setting a target boost pressure at the output of the compressor. The adjusting member is controlled depending on an exhaust gas counterpressure to be set in an exhaust gas line of the internal combustion engine. It is provided that, depending on the target boost pressure, a target pressure ratio is determined via the compressor, that depending on the target pressure ratio via the compressor a target expansion ratio is determined via the turbine having variable turbine geometry of the exhaust gas turbo charger, wherein the target expansion ratio describes the ratio between the exhaust gas counterpressure to be set and the pressure at the output of the turbine, and that the adjusting member is controlled depending on the target expansion ratio. Also here it is disadvantageous that the adjusting variable of the adjusting member for setting the turbine geometry is in the same way determined only from a mathematical factor, which is based on the detected pressure in flow direction of the exhaust gas in the exhaust gas line after the turbine and the pressure in flow direction of the exhaust gas in the exhaust gas line before the turbine.

The task upon which the invention is based is the specification of a method which influences the exhaust gas counterpressure before the turbine in the desired manner and simultaneously takes into consideration dynamic states when operating the internal combustion engine.

The starting point of the invention is a method for operating an internal combustion engine having an exhaust gas turbo charger for compressing the air supplied to the internal combustion engine, wherein a drive performance of a turbine of the exhaust gas turbo charger in an exhaust gas line of the internal combustion engine is altered by varying a turbine geometry of the turbine, wherein in a first control algorithm a target boost pressure at the output of the compressor of the exhaust gas turbo charger in the air supply line upstream from the combustion motor is controlled depending on a target exhaust gas counterpressure to be set in an exhaust gas line downstream from the combustion motor before the turbine of the internal combustion engine, wherein an opening cross-section surface of the turbine, which is controlled via an adjusting stroke of an adjusting member assigned to the turbine depending on a target value assigned to the predetermined target boost pressure, is assigned to the target boost pressure.

According to the invention it is provided that the adjusting member of the turbine controlled via the first control algorithm is controlled via a second control algorithm given an upper threshold value of the target exhaust gas counterpressure in the exhaust gas line upstream from the turbine by intervening in the first control algorithm with an adapted target value, when the following conditions are simultaneously fulfilled:

In a primary control path of the second control algorithm there occurs a control deviation upstream from the turbine, which deviation is formed from an actual exhaust gas counterpressure upstream from the turbine and the predetermined target exhaust gas counterpressure upstream from the turbine.

In a secondary control path of the second control algorithm there occurs a control deviation downstream from the compressor, which deviation is formed from an actual boost pressure of the compressor and the target boost pressure at the output of the compressor.

It is preferably provided that the second control algorithm takes into consideration dynamic states of the internal combustion engine via the control paths and where necessary intervenes at an intervention point into the first control algorithm.

It is further preferred that the actual exhaust gas counterpressure upstream from the turbine and the predetermined target exhaust gas counterpressure are supplied to a first subtract module within the primary control path of the second control algorithm and the control deviation is determined.

It is furthermore preferably provided that the control deviation of the primary control path of the second control algorithm and the target value of the first control algorithm are supplied at the intervention point to a second subtract module, wherein the target exhaust gas counterpressure belonging to the target value of the first control algorithm is corrected by means of the control deviation present from the first subtract module, such that at the intervention point is formed a corrected target value and the target value, thus corrected, is outputted via a switch, such that the adjusting stroke of the adjusting member of the turbine is corrected taking into consideration dynamic states of the internal combustion engine.

It is preferably provided that the control deviation of the primary control path of the second control algorithm is modified before it is supplied to the second subtract module at the intervention point, in that the control deviation is smoothed by means of a characteristic curve and, by means of a low-pass filter according to a characteristic curve depending on an environmental pressure is equipped with an amplification factor, such that a modified control deviation is transferred to the second subtract module at the intervention point.

Finally, it is preferably provided that the control deviation in the primary control path and the control deviation in the secondary control path of the second control algorithm, after they have respectively overshot a predeterminable threshold value of a hysteresis block, are switched to active and via an "and" relation are guided to the switch of the intervention point, wherein the switch is now closed when both control deviations are active, such that an intervention of the second control algorithm into the first control algorithm at the intervention point takes place only when the switch is closed.

Furthermore an internal combustion engine configured to perform the method is claimed, comprising an exhaust gas turbo charger for compressing the air supplied to the internal combustion engine, a compressor, a combustion motor and a turbine having variable turbine geometry, which is connected via a shaft to the compressor, and a control device, in which are stored a computer-readable programme algorithm for carrying out the method and where necessary required characteristic diagrams.

BRIEF DESCRIPTION OF THE DRAWINGS

The invention will be explained hereinafter with reference to the associated figures.

DETAILED DESCRIPTION OF THE INVENTION

Figure 1:
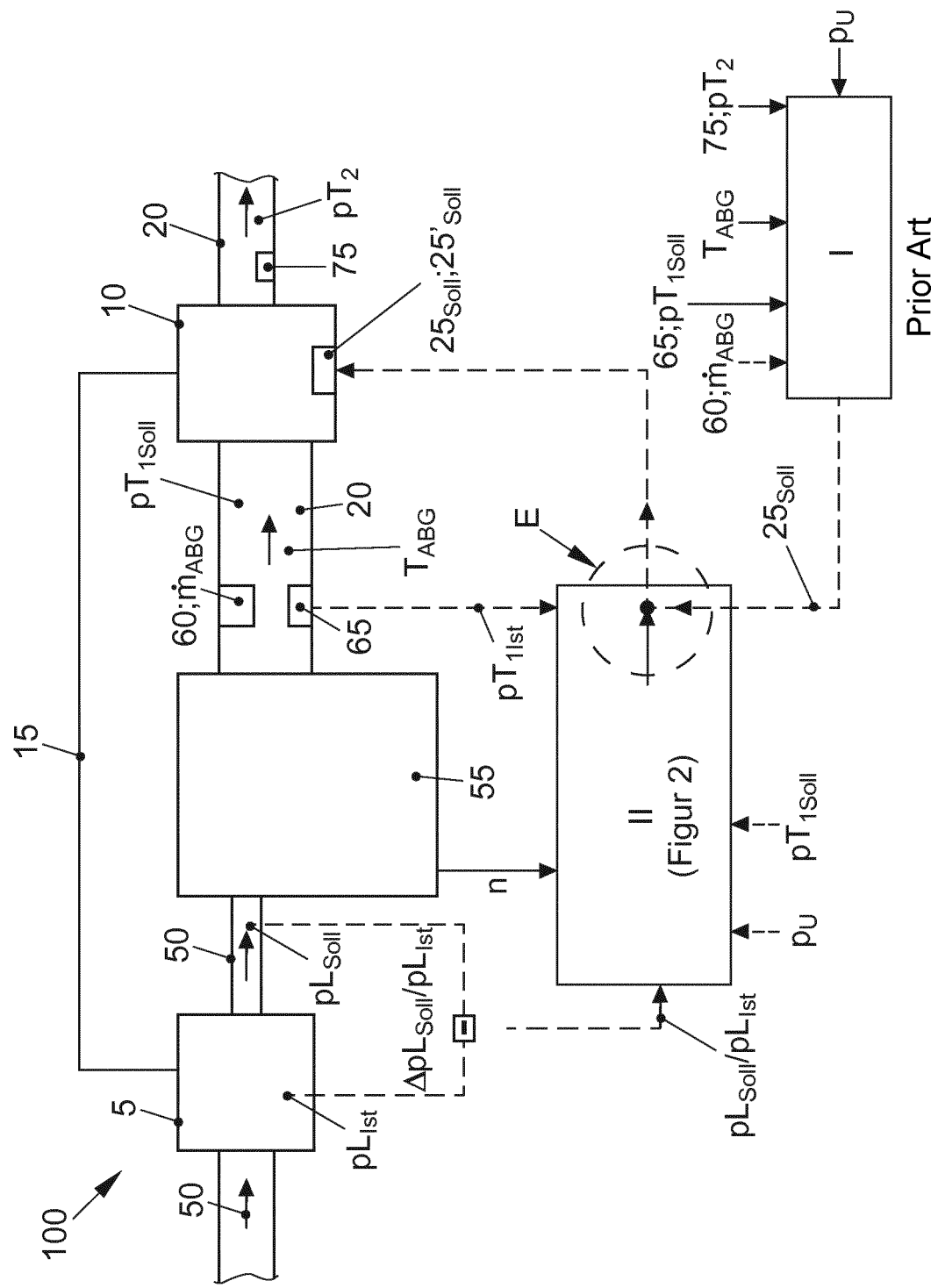
FIG. 1 shows a schematic view of an internal combustion engine having the associated components for performing the method.

In FIG. 1, an internal combustion engine is referenced with the reference sign 100.

The internal combustion engine 100 comprises a combustion motor 55, which can be for example in the form of a petrol motor or diesel motor. Fresh air is supplied in the direction of the arrow via an air supply line 50 to the combustion motor 55. Here, a compressor 5 of an exhaust gas turbo charger, for compressing the fresh air supplied to the combustion motor 55, is disposed in the air supply line 50. The exhaust gas turbo charger is driven via a shaft 15 by a turbine 10 which is disposed in an exhaust gas line 20 of the internal combustion engine 100. The exhaust gas turbo charger thus comprises the compressor 5, the shaft 15 and the turbine 10.

The turbine 10 is driven by an exhaust gas mass flow $\dot{m}_{ABG}$ in the exhaust gas line 20. The flow direction of the exhaust gas and thus of the exhaust gas mass flow $\dot{m}_{ABG}$ is shown in FIG. 1 also using arrows.

In flow direction of the exhaust gas, in the exhaust gas line 20 before the turbine 10 a first pressure $pT_{1st}$ and a specified exhaust gas temperature $T_{ABS}$ prevail.

In flow direction of the exhaust gas, in the exhaust gas line 20 after the turbine 10 a second pressure $pT_2$ prevails.

The exhaust gas mass flow $\dot{m}_{ABG}$ can be measured or modelled in a known manner by means of a mass flow meter 60 (not shown).

The first pressure $pT_{1st}$ can be measured in a known manner by means of a pressure sensor 65 or modelled in a different manner.

The second $pT_{2st}$ can be measured in a known manner by means of a pressure sensor 75 or modelled in a different manner.

An adjusting member 25 of the turbine 10 is controlled for the realisation of a predetermined target boost pressure $pL_{Soll}$ in the air supply 50 in flow direction of the fresh air downstream from the charger. The adjusting member 25 adjusts in a known manner guide blades of the turbine 10 and thereby alters the turbine effectiveness and the effective opening cross-section surface of the turbine 10.

The adjusting of the guide blades of the turbine 10 is carried out via an adjusting variable or an adjusting stroke of the adjusting member 25.

In the conventional method, for realising the predetermined target boost pressure $pL_{Soll}$ of the charger a target value $25_{Soll}$ is predetermined for the adjusting stroke of the adjusting member 25. The guide blades of the turbine 10 are then set on the basis of the realised target value $25_{Soll}$ of the adjusting stroke such that the resulting turbine effectiveness results in the desired target boost pressure $pL_{Soll}$ of the charger.

With the aid of the physical correlations between the first pressure $pT_{1st}$ before the turbine 10, that is the exhaust gas counterpressure, the exhaust gas mass flow $\dot{m}_{ABG}$ in the exhaust gas line 20 and an actual value $25_{Ist}$ for the adjusting stroke of the adjusting member 25, a limit value can be determined for the adjusting stroke of the adjusting member 25 with respect to a maximum turbine performance from a predetermined pressure ratio $pT_{1Ist}$-$pT_{2Ist}$. The states taken into consideration in the case of this procedure are valid, however, only in the steady state of the internal combustion engine 100, as is also disclosed in the document EP 1 471 234 A2, wherein only the pressure ratio $pT_{1Ist}$-$pT_{2Ist}$ is taken into consideration in the exhaust gas line 20.

In order to improve this, the invention specifies a method which influences the exhaust gas counterpressure pressure $pT_{1Ist}$ before the turbine 10 such that in an advantageous manner dynamic states are taken into consideration during the operation of the internal combustion engine 100, as will be further described hereinafter with reference to FIGS. 1 and 2 in comparison.

The method according to the invention uses an exhaust gas counterpressure control algorithm I, which, in particular in the case of dynamic operational states, which occur and are recognised as a result of a control deviation $\Delta pL$ between the actual boost pressure $pL_{Ist}$ of the charger and the target boost pressure $pL_{Soll}$ of the charger, is superimposed by a control algorithm II according to FIG. 2, which will be explained in more detail hereinafter.

The exhaust gas counterpressure control algorithm I can be the already explained exhaust gas counterpressure control algorithm I or another exhaust gas counterpressure control algorithm known from the prior art.

Figure 2:
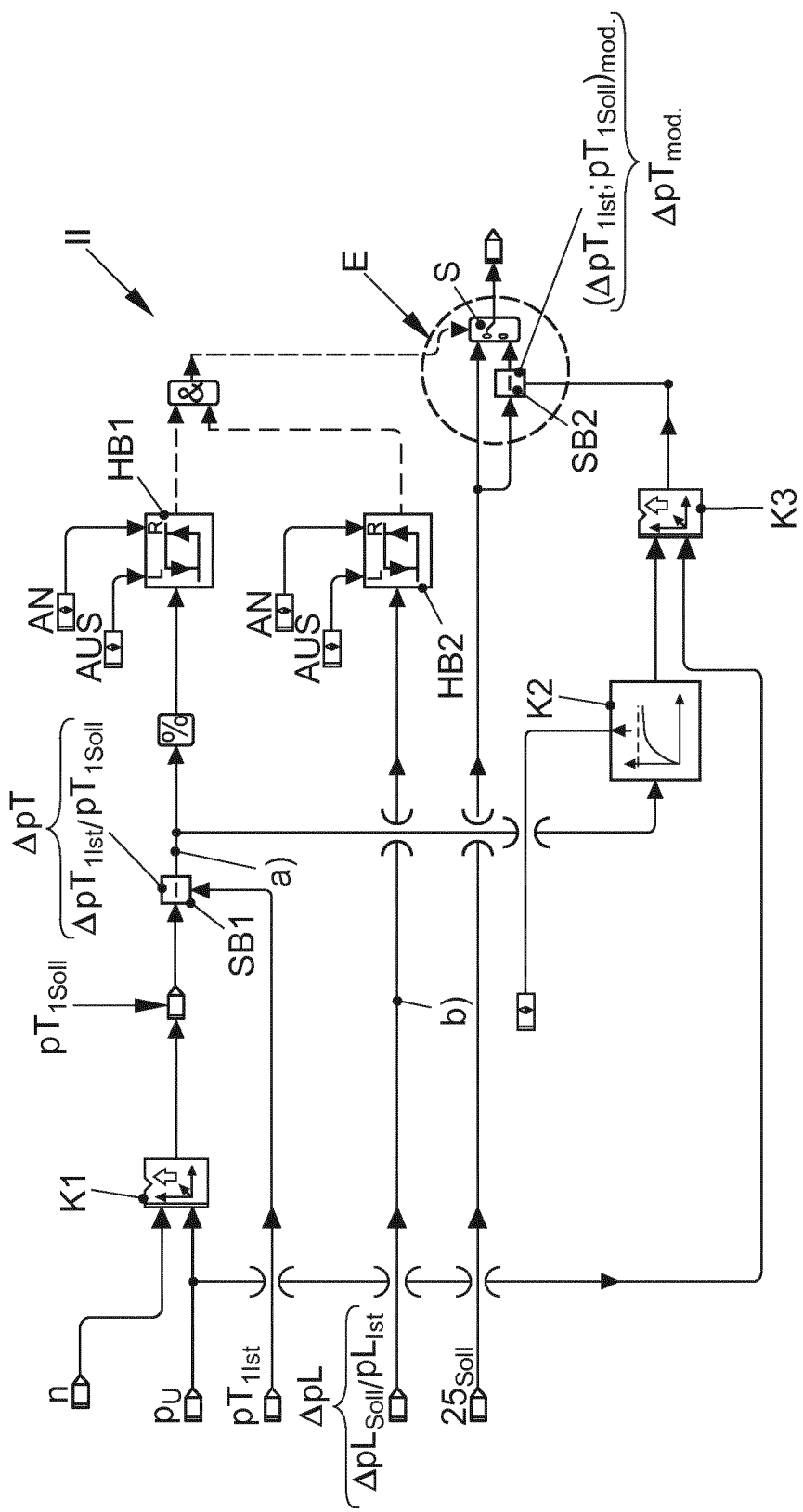
FIG. 2 shows a function diagram for explaining the method according to the invention and the associated internal combustion engine having its associated components.

The control algorithm II according to the invention according to FIGS. 1 and 2 in detail uses the following input parameters.

By means of a RPM sensor (not shown), an engine speed n of the combustion motor 55 is determined.

By means of a pressure sensor (not shown), furthermore, an environmental pressure $p_U$ is provided.

As already explained, the first pressure $pT_{1Ist}$ (exhaust gas counterpressure (upstream) before the turbine 10) is measured by means of the pressure sensor 65 or modelled in a different manner and is made available for use as a model variable.

In addition, by means of pressure sensors (not shown), the actual boost pressure $pL_{Ist}$ of the charger and the target boost pressure $pL_{Soll}$ of the charger is measured, and in a secondary boost pressure control path b) the control deviation $\Delta pL=(pL_{Soll}-pL_{Ist})$ is determined, which in the same way is made available as an input parameter for the control algorithm II.

If the control deviation $\Delta pL=0$, the actual boost pressure $pL_{Ist}$ has the desired target value, such that an intervention into the control algorithm I is not necessary, since the boost pressure control path b) with the control deviation $\Delta pL=0$ is in a steady state.

If the control deviation $\Delta pL>0$, the actual boost pressure $pL_{Ist}$ does not have the desired target value, such that an intervention into the hitherto existing control algorithm I is necessary, since the boost pressure control path b) in the case of a control deviation $\Delta pL>0$ is not in a steady state.

Finally, the target value $25_{Soll}$, known from the hitherto existing control algorithm I, for the adjusting stroke of the adjusting member 25 is made available to the new control algorithm.

It is clear that the target value $25_{Soll}$ for the adjusting stroke of the adjusting member 25 can be a target value determined according to the method of document EP 1 471 234 A2. It is however once more noted that the method according to the invention can be used in the same manner also for other known methods which determine the target value for the adjusting stroke of the adjusting member 25 in another manner than that described in document EP 1 471 234 A2.

According to the invention, the already mentioned secondary boost pressure control path b) and a primary control path a) are followed within the new control algorithm II.

The primary exhaust gas counterpressure control path a) concerns the control deviation $\Delta pL=(pL_{Soll}-pL_{Ist})$ of an actual exhaust gas counterpressure $pT_{1Ist}$ before the turbine 10 (downstream from the combustion motor 55) with respect to a target exhaust gas counterpressure $pT_{1Soll}$ before the turbine 10.

The target exhaust gas counterpressure $pT_{1Soll}$ is supplied as a value to be maintained, in particular as a predeterminable upper limit value, to the exhaust gas counterpressure control path a) of the control algorithm II) (compare FIG. 2) depending on the environmental pressure $p_U$ and depending on the engine speed n of the combustion motor 55 (compare characteristic curve K1) to a subtract module SB1 for determining the control deviation $\Delta pT=(pT_{1Soll}-pT_{1Ist})$.

If the control deviation $\Delta pT$ of the exhaust gas counterpressure before the turbine 10=0, an intervention of the second control algorithm II onto the previously existing control algorithm I depending on the exhaust gas counterpressure control path a) is not necessary, since the exhaust gas counterpressure control in the case of a control deviation $\Delta pT=0$ is in a desired steady state.

If the control deviation $\Delta pT$ of the exhaust gas counterpressure before the turbine 10>0, an intervention of the second control algorithm II onto the previously existing control algorithm I depending on the exhaust gas counterpressure control path a) is necessary, since the exhaust gas counterpressure control in the case of a control deviation $\Delta pT>0$ is not in a desired steady state.

The determined control deviation $\Delta pT>0$ of the exhaust gas counterpressure before the turbine 10 is guided onto a hysteresis block B1 which checks whether the control deviation $\Delta pT_{1Ist}-pT_{1Soll}>0$ is located in a first band having low control deviation or, by exceeding a predeterminable threshold value, in a second band having greater control deviation. Only if it is established that a greater control deviation is present, an output of the hysteresis block HB1 becomes active, i.e. is switched on. Thus, in an advantageous manner small control deviations $\Delta pT>0$ of the exhaust gas counterpressure control path a) are not taken into consideration. The output of the hysteresis block B1 is switched to active when the determined control deviation $\Delta pT>0$ overshoots the previously set limit value (the threshold value).

Analogously thereto, the determined control deviation $\Delta pL=(pL_{Soll}-pL_{Ist})>0$ of the actual boost pressure $pL_{Ist}$ with respect to the target boost pressure $pL_{Soll}$ is guided in the same way onto a hysteresis block HB2 which checks whether the control deviation $\Delta pL>0$ is located in a first band with small control deviation or in a second band with greater control deviation. Only if it is determined that a greater control deviation above a predeterminable threshold value is present in the second band does an output of the hysteresis block B2 become active, i.e. is switched on. Thus, in an advantageous manner, small control deviations $\Delta pL>0$ of the boost pressure control path b) are not taken into consideration. The output of the hysteresis block B2 is switched to active when the determined control deviation $\Delta pT>0$ overshoots the previously set limit value (the threshold value).

By means of the hysteresis blocks HB1, HB2, rapid repetitions of switching-on and switching-off procedures, i.e. rapid activating and deactivating of the control paths a), b), are avoided.

According to the invention, the new control algorithm II is only switched to active when both outputs, the output of the primary control path a) and of the secondary control path b) (&), are switched to active.

Thereby it is recognised simultaneously whether an exhaust gas counterpressure control deviation $\Delta pT_{1Soll}-pT_{1Ist}>0$ of the exhaust gas counterpressure $pT_{1Ist}$ is even present and whether a dynamic operational state in operating the internal combustion engine 100, i.e. a boost pressure control deviation $\Delta pL_{Soll}-pL_{Ist}>0$, is present. Only then is a release command also outputted, which is shown by the &-relation in FIG. 2.

By means of the release command, the conventional target value $25_{Soll}$ for the adjusting stroke of the adjusting member 25 is functionally released for an intervention point E by switching a switch S for a possible intervention. In other words, the switch S shown in FIG. 2 is switched, starting from the shown not-switched position, and the intervention according to the invention is possible.

The switch S is then switched to the control deviation $\Delta pT=(\Delta pT_{1Ist}-pT_{1Soll})$, shown in the intervention point E, of the exhaust gas counterpressure $pT_{1Ist}$ before the turbine 10 onto a further subtract module SB2.

Thus, now, depending on the control deviation $\Delta pT_{1Ist}-pT_{1Soll}$ behind the first subtract module SB1 of the primary control path a), the conventional target value $25_{Soll}$ by means of the subtract module SB2 as a correction value corresponding to the deviation present in the second subtract module SB2, a corrected target value $25'_{Soll}$ can be outputted, i.e. the conventional target value $25_{Soll}$ is altered depending on occurring dynamic states, in particular the boost pressure control deviation $\Delta pL>0$ is altered according to the secondary control path b), but only when an exhaust gas counterpressure control deviation $\Delta pT>0$ is even present in the primary control path a).

In other words, the guide blades of the turbine 10 are then set on the basis of the target value $25'_{Soll}$ according to the invention of the adjusting stroke such that the resulting turbine effectiveness, in addition to an optimum turbine performance of the turbine 10 depending on the desired target exhaust gas counterpressure $\Delta pT_{1Soll}$, and depending on dynamic states in the secondary control path b) of the new control algorithm II, results in a corresponding target boost pressure $pL_{Soll}$ of the charger before the combustion motor 55.

In an advantageous manner, now the exhaust gas counterpressure $pT_{1Ist}$ before the turbine 10 is actively controlled depending on the control deviation $\Delta pT>0$ above a predeterminable band of the first hysteresis block HB1 of the exhaust gas counterpressure $pT_{1Soll}$ and depending on a boost pressure control deviation $\Delta pL>0$ above a predeterminable band of the second hysteresis block HB2.

In this regard, the exhaust gas counterpressure control deviation $\Delta pT$ is weighted before it is supplied to the second subtract module SB2 at the intervention point E.

The weighting is carried out by modifying the exhaust gas counterpressure control deviation $(\Delta pT_{mod.})(pT_{1Soll}-pT_{1Ist})_{mod.}$, in that the exhaust gas counterpressure control deviation $\Delta pT=(pT_{1Soll}-pT_{1Ist})$ is smoothed according to the characteristic curve K2 via a low-pass filter and is equipped with an amplification factor according to the characteristic curve 3 depending on the environmental pressure $p_U$.

By means of the method, in an advantageous manner it is ensured that the controlling of the VTG-ATL is influenced by means of the determined or modelled exhaust gas counterpressure $pT_{1Ist}$ to the effect that an accumulation of the exhaust gas counterpressure $pT_{1Ist}$ which is too high is avoided. Thus, the effect is achieved that the residual gas content in a combustion chamber of a cylinder of the combustion motor 55 is effectively reduced.

Moreover, an improvement in the engine smoothness and in the combustion effectiveness, and the controllability of the VTG-ATL are improved, since the method results in a reduction in boost pressure overshoots.

The use of the exhaust gas counterpressure sensor for determining the exhaust gas counterpressure $pT_{1Ist}$ or the use of a model value of the exhaust gas counterpressure $pT_{1Ist}$ in combination with a petrol motor VTG-ATL or diesel VTG-ATL according to the method constitutes a new measure in controlling and regulating.

In an advantageous manner, by means of the active regulation of the exhaust gas counterpressure $pT_{1Ist}$, all tolerances and component distributions of the combustion motor 55 and of the VTG-ATL of the exhaust gas system can be taken into consideration.

In an advantageous manner, the drive dynamic of the vehicle is improved, since the motor control with respect to the torque generation is optimised via the active regulation, depending on the boost pressure $pT_{1Ist}$ of the exhaust gas counterpressure $pT_{1Ist}$, and not, as hitherto, exclusively via the exhaust gas counterpressure regulation. Thus, finally, the driving performance is improved, since the vehicle accelerates in a more harmonious manner when using the method, since dynamic states are taken into consideration.

By means of the method, a maximum turbine performance of the turbine 10 can be generated while simultaneously maintaining the target value $25'_{Soll}$ of the adjusting stroke for the guide blades of the turbine 10, wherein an optimisation of the exhaust gas counterpressure $pT_{1Ist}$ also facilitates a maximisation of the exhaust gas mass flow $\dot{m}_{ABG}$ in the exhaust gas line 20.

LIST OF REFERENCE SIGNS 100 internal combustion engine
5 compressor
10 turbine
15 shaft
20 exhaust gas line
25 adjusting member
$25_{Soll}$ target value of the adjusting member
$25'_{Soll}$ corrected target value of the adjusting member 25
50 air supply line
55 combustion motor
n engine speed
60 mass flow meter
65 pressure sensor
75 pressure sensor
$\dot{m}_{ABG}$ exhaust gas mass flow in the exhaust gas line 20
$pT_1$ first pressure upstream from the turbine 10
$T_{ABG}$ temperature of the exhaust gas upstream from the turbine 10
$pT_2$ second pressure downstream from the turbine 10
$pT_{1Ist}$ actual exhaust gas counterpressure upstream from the turbine 10
$pT_{1Soll}$ target exhaust gas counterpressure upstream from the turbine 10
$\Delta pT=\Delta(pT_{1Soll}-pT_{1Ist})$ control difference $\Delta pT$ upstream from the turbine
$pL_{Soll}$ target boost pressure downstream from the compressor 5
$pL_{Ist}$ actual boost pressure of the compressor 5
$\Delta pL=\Delta(pL_{Soll}-pL_{Ist})$ control difference $\Delta pL$ downstream from the compressor 5

I conventional control algorithm
II control algorithm according to the invention
a) primary control path
b) secondary control path
$p_U$ environmental pressure
SB1 first subtract module
SB2 second subtract module
HB1 hysteresis block
HB2 hysteresis block
E intervention point
S switch
K1, K2, K3 characteristic curves

The invention claimed is:

1. A method for operating an internal combustion engine having an exhaust gas turbo charger for compressing the air supplied to the internal combustion engine, comprising:
　altering a drive performance of a turbine of the exhaust gas turbocharger in an exhaust gas line of the internal combustion engine by varying a turbine geometry of the turbine,
　in a first control algorithm, controlling a target boost pressure at the output of the compressor of the exhaust gas turbo charger in the air supply line upstream of a combustion motor, depending on a target exhaust gas counterpressure to be set in an exhaust gas line downstream from the combustion motor before the turbine of the internal combustion engine,
　assigning to the target boost pressure an opening cross-section surface of the turbine, which is controlled via an adjusting stroke of an actuator assigned to the turbine depending on a target value assigned to the predetermined target boost pressure,
　controlling the actuator of the turbine, which is controlled via the first control algorithm, via a second control algorithm given an upper limit value of the target exhaust gas counterpressure in the exhaust gas line upstream from the turbine by intervening into the first control algorithm with an adapted target value, when
　　in a primary control path a) of the second control algorithm, an exhaust gas back pressure control deviation occurs upstream from the turbine, which deviation is wherein the exhaust gas back pressure control deviation is determined by subtracting an actual exhaust gas counterpressure upstream from the turbine from the target exhaust gas counterpressure upstream from the turbine, and
　　in a secondary control path b) of the second control algorithm, a boost pressure control deviation occurs downstream from the compressor, which deviation is formed from an actual boost pressure of the compressor and the target boost pressure at the output of the compressor,
　modifying the exhaust gas back pressure control deviation to be smoothed by a first characteristic curve provided with a gain factor and by a low-pass filter according to a second characteristic curve depending on an environmental pressure, such that a modified control deviation is transferred to the second subtract module at the intervention point,
　supplying the modified exhaust gas back pressure control deviation and the target value of the first control algorithm at an intervention point, and forming the corrected target value at the intervention point,
　outputting a corrected target value via a switch,
　correcting the adjusting stroke of the actuator of the turbine by taking into consideration dynamic states of the internal combustion engine only if the outputs of the primary control path a) and secondary control path b) are activated and the switch is closed.

2. The method according to claim 1, further including:
　actively switching and guiding the exhaust gas back pressure control deviation and the boost pressure control deviation to the switch of the intervention point after the exhaust gas back pressure control deviation and the boost pressure control deviation have in each case overshot a predeterminable threshold value of a hysteresis block, wherein the switch is only closed when both control deviations are active, such that an intervention of the second control algorithm into the first control algorithm at the intervention point takes place only when the switch is closed.

3. An internal combustion engine configured to perform the method according to claim 1, comprising:
　an exhaust gas turbo charger for compressing the air supplied to the internal combustion engine,
　a compressor,
　a combustion motor,
　a turbine having variable turbine geometry which is connected via a shaft to the compressor, and
　a control device, in which are stored a computer-readable program algorithm for carrying out the method of claim 1 and, where necessary, required characteristic diagrams.

* * * * *